United States Patent
Larson et al.

(10) Patent No.: US 7,409,245 B1
(45) Date of Patent: Aug. 5, 2008

(54) VARIABLE ANTENNA MATCHING NETWORK FOR AN IMPLANTABLE ANTENNA

(75) Inventors: Dennis E. Larson, White Bear Lake, MN (US); Prashant Rawat, Blaine, MN (US); Daniel Kollmann, Andover, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

(21) Appl. No.: 11/668,622

(22) Filed: Jan. 30, 2007

(51) Int. Cl.
*A61N 1/375* (2006.01)
(52) U.S. Cl. ............... 607/36; 607/60; 343/860
(58) Field of Classification Search ............ 607/36, 607/60, 33, 61; 343/860, 850, 861
See application file for complete search history.

(56) References Cited

U.S. PATENT DOCUMENTS

| | | | |
|---|---|---|---|
| 5,778,308 A | 7/1998 | Sroka et al. | |
| 5,861,019 A * | 1/1999 | Sun et al. | 607/60 |
| 6,456,256 B1 | 9/2002 | Amundson et al. | |
| 6,574,510 B2 | 6/2003 | Von Arx et al. | |
| 6,675,045 B2 | 1/2004 | Mass et al. | |
| 6,708,065 B2 | 3/2004 | Von Arx et al. | |
| 6,809,701 B2 | 10/2004 | Amundson et al. | |
| 6,889,084 B2 * | 5/2005 | Thompson et al. | 607/36 |
| 6,978,126 B1 | 12/2005 | Blaker et al. | |
| 7,047,076 B1 | 5/2006 | Li et al. | |
| 2005/0010265 A1* | 1/2005 | Baru Fassio et al. | 607/48 |
| 2006/0247737 A1* | 11/2006 | Olson et al. | 607/61 |
| 2007/0010702 A1* | 1/2007 | Wang et al. | 600/8 |
| 2007/0100385 A1 | 5/2007 | Rawat et al. | |

* cited by examiner

*Primary Examiner*—Tho G Phan
(74) *Attorney, Agent, or Firm*—Schwegman, Lundberg & Woessner, P.A.

(57) ABSTRACT

An implantable medical device may have an antenna for communication with external devices or other internal devices. Changes in the patient's body position, weight, composition or other factors may change the antenna efficiency and hinder communication. The disclosed circuit may automatically adjust a matching network for an implanted transceiver to dynamically maximize transmission and reception by controlling the selected value of a plurality of capacitors, inductors and resistors.

23 Claims, 3 Drawing Sheets

VARIABLE ANTENNA MATCHING NETWORK FOR AN IMPLANTABLE ANTENNA

TECHNICAL FIELD

This disclosure relates generally to implantable medical devices, and to implantable antennas with a variable antenna matching network for device communications.

BACKGROUND

Electronic devices can communicate wirelessly with each other, such as by using RF communication between an antenna at each such electronic device. For example, an implantable medical device (IMD) can communicate wirelessly with an external device, such as a local external programmer for the IMD or a local RF transceiver. The local external programmer may then communicate with a remote external server or other device, such as by using a wired or wireless communication or computer network. The patient and doctor would benefit from improved communication between an IMD and external device.

OVERVIEW

Matching networks can be used in wireless systems to match a transceiver's impedance to an antenna's impedance. The matching network can help provide the maximum power transfer from a source to a load, such as an antenna. The source impedance should equal the complex conjugate of the load impedance for maximum power transfer. The antenna's impedance also varies depending upon the frequency and antenna environment. The impedance in wireless systems can be fixed to a calculated value to optimize the antenna for its desired purpose, operating frequency and operating environment. The present inventors have recognized that, for an implantable medical device, the antenna impedance is not fixed, but rather varies based upon the dielectric constant of the medium surrounding the antenna. The implantable medical device can be tested in air before insertion into the body to help ensure that the entire device is operational. However, the operational medium for the implantable medical device while inside a body is quite different from the air. A fixed matching network can attempt to balance the required performance in the air versus the required performance inside a body.

Another potential issue with the use of a fixed matching network is that the designated operational frequency may be different in different parts of the world, since different governmental bodies may designate different frequencies for various jurisdictions. Thus, the matching network may have to be changed depending upon the particular market in which the implantable medical device is to be sold. This may result in manufacturing inefficiencies and stocking problems and—even if these challenges can be met—does not resolve the issue of an IMD implanted in a person who moves from one geographic jurisdiction to another jurisdiction having a different operational frequency. Thus, the present inventors have recognized that there exists a need in the art for improved matching networks, particularly with respect to the manufacture of implantable medical devices.

An implantable medical device may have an antenna for communication with external devices or other internal devices. Changes in the patient's body position, weight, composition or other factors may change the antenna efficiency and hinder communication. The disclosed circuit may automatically adjust a matching network for an implanted transceiver to dynamically maximize transmission and reception by controlling the selected value of a plurality of capacitors, inductors and resistors.

This overview is intended to provide an overview of the subject matter of the present patent application. It is not intended to provide an exclusive or exhaustive explanation of the invention. The detailed description is included to provide further information about the subject matter of the present patent application.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

A variable matching network may be used to provide an antenna system that operates well in the air, such as for testing purposes, as well as in a human or animal body within which it is intended to operate, without having to compromise the network design. In certain examples, the same variable impedance matching network may also be used to respond to slowly changing impedance environments, such as due to a patient's weight gain or dehydration.

Forming a variable matching network of discrete components may present certain issues, such as the amount of printed circuit board space required, and the reliability of numerous individual solder connections. Thus, a monolithic integrated circuit approach to fabricating a variable matching network may have superior cost, reliability, or size as compared to a discrete design. Integrated circuits may provide highly accurate and reproducible capacitor and resistor values, but inductors can be somewhat difficult to realize in integrated circuit form. Moreover, removing inductors as one of the potential variable components used in design of a variable matching network can reduce complexity to a tuning technique used to determine a direction of impedance change for improving transmission or reception. The voltage standing wave ratio (VSWR) ratio may be measured and may indicate the need for tuning the variable matching network.

Figure 1:
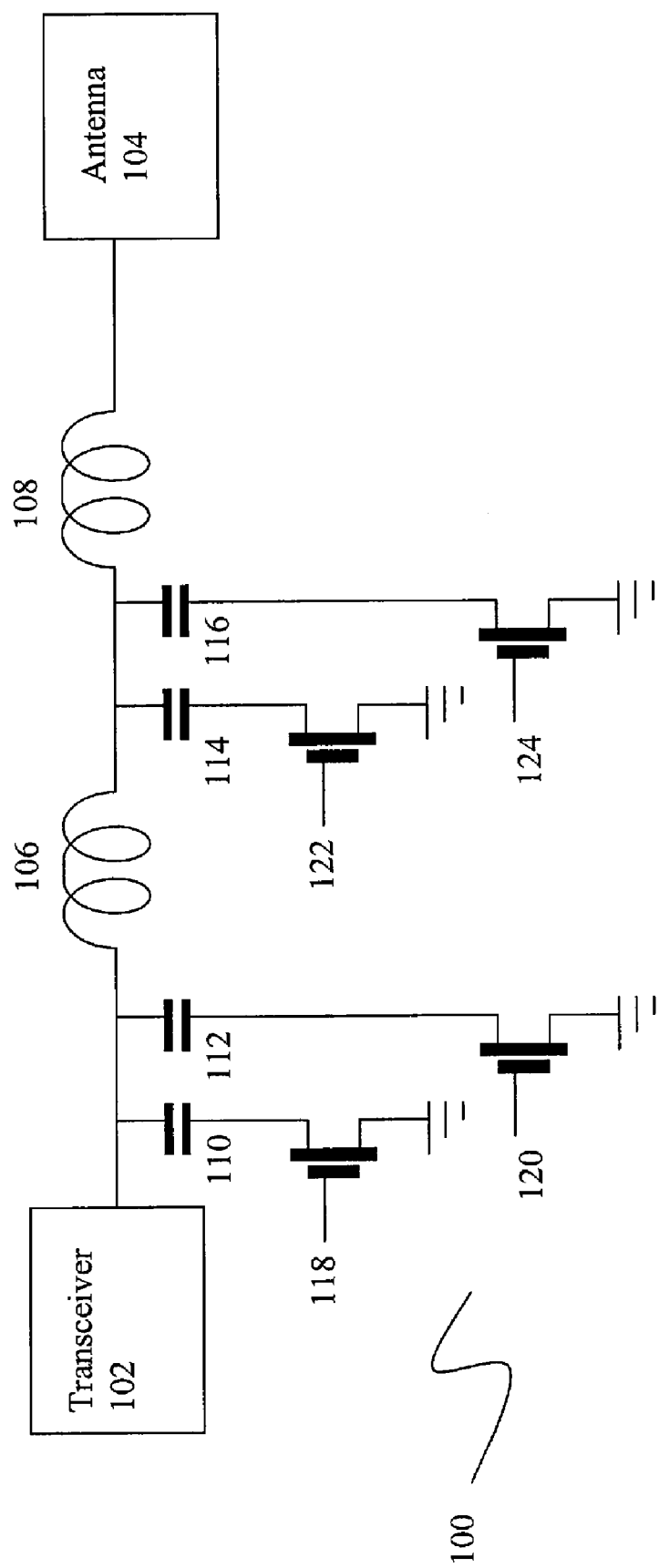
FIG. 1 illustrates a schematic of a variable matching network.

FIG. 1 illustrates a schematic of a variable matching network. The device 100 can include a matching circuit between a radio transceiver 102 and an antenna 104. The device 100 matching circuit may include inductors 106 and 108 and resistors (not shown for simplicity) between the transceiver 102 and the antenna 104, and may include capacitors 110, 112, 114 and 116 and resistors (not shown for simplicity) between the transmission line and a ground potential.

Moreover, there may be multiple paths between the transceiver 102 and the antenna 104. One or more such paths can have an arrangement similar to that shown, but different paths may have different impedance values. The multiple paths may be arranged so that one or more such paths is individually selectable, or such that one or more such paths can vary impedance such as within a range of values. In certain examples, the individual ranges may minimize or avoid any overlap in impedance values between different paths. With such an arrangement, the general impedance range of interest may be easily selected, and the finer impedance tuning may be accomplished within the selected path, such as in the fashion discussed herein.

Within a selected path, the impedance value may be established, such as by selecting which of the capacitors 110, 112, 114 and 116 is connected to the ground potential. This may be selected either externally, such as by user command, or automatically by an internal controller circuit, by selectively turning on a combination of switches 118, 120, 122, and 124. In this illustration, the switches are shown as metal-oxide (or other insulator)-semiconductor field effect transistors (e.g., MOSFETs); other types of switches may be used. The present subject matter is not limited to the illustrated two capacitor per inductive link, or to any specific number of inductive links or capacitors. Also, the values of the capacitors need not be the same, nor any particular value, since the specific capacitor, inductor, or resistor values can depend upon the impedance range desired or the granularity of the difference in selectable impedance values.

Figure 2:
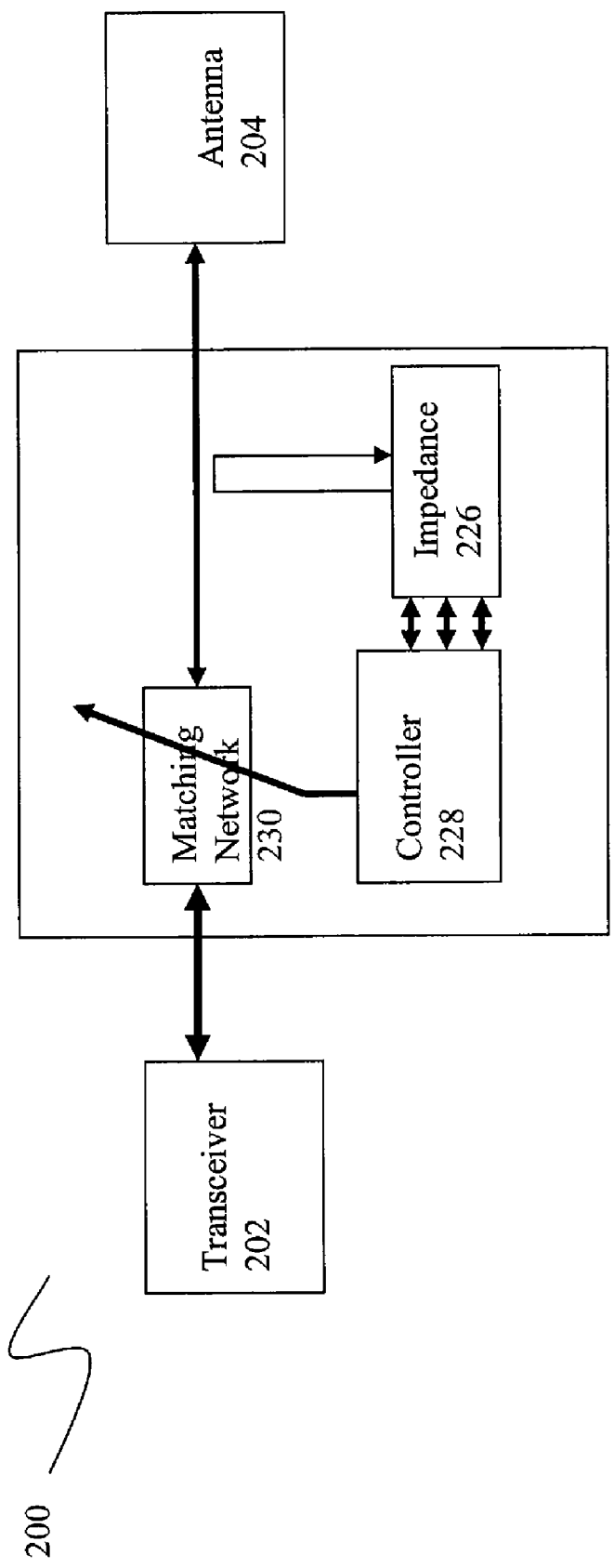
FIG. 2 illustrates an automatic variable matching network according to various embodiments.

FIG. 2 illustrates an example of an automatic variable matching network 200. In this example, a transceiver 202 is connected to antenna 204 by one or more selectable transmission lines. One or more of these transmission lines can be arranged as shown. The transceiver 202 may be connected to an impedance mismatch measuring circuit 226. The impedance measuring circuit 226 may transmit the impedance information to a controller circuit 228. The controller circuit 228 may provide use this information to provide a resulting control signal to a variable matching network 230, which may be similar to the arrangement discussed with respect to FIG. 1. The controller circuit 228 may select a combination of one or more capacitor, inductor, or resistor paths, such as to enable the variable matching network 230 to change the impedance to improve antenna transmission efficiency. In certain examples, there may be more than one antenna, and the controller circuit may enable a different antenna depending upon the desired frequency range.

Figure 3:
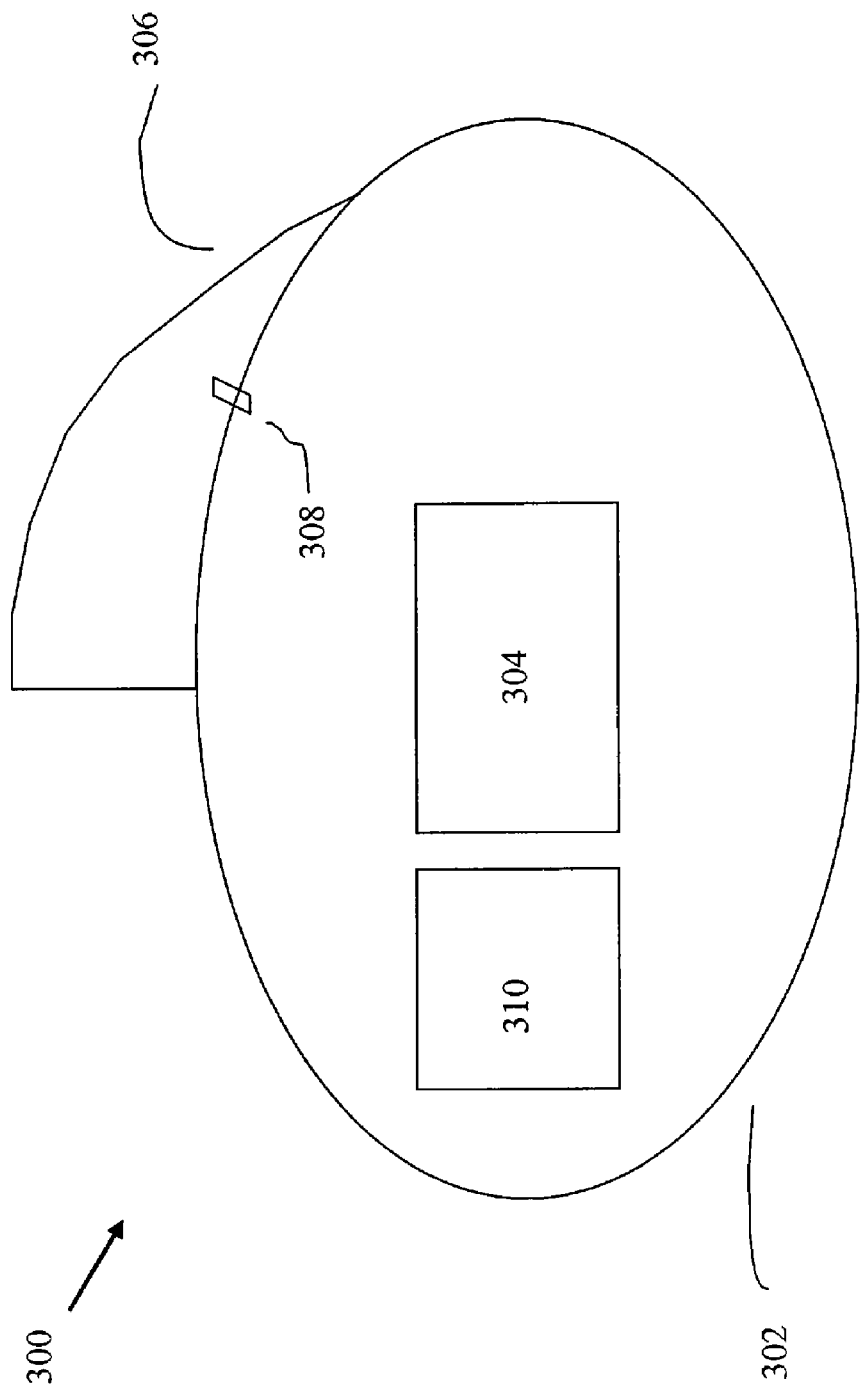
FIG. 3 illustrates an implantable biomedical device that may use a variable matching network formed according to various embodiments.

FIG. 3 illustrates an implantable medical device 300, which may use an implantable antenna to communicate with an external device, such as to communicate patient diagnostic information to a clinician or other user, or to receive one or more external user commands from a clinician or other user. Such an implantable medical device 300 may have a changing impedance environment, as discussed above. Therefore, the implantable medical device 300 may benefit from a variable tuning network. The implantable medical device 300 may include a pacing or defibrillator circuit and power source for providing pacing or shock therapy to a patient's heart. One or more therapy control parameters may be transmitted to the implantable medical device 300 via an antenna. The implantable medical device 300 is placed within the body of a patient. A particular patient may have a different dielectric constant, and thus present a different impedance environment, than other patients. Moreover, the dielectric constant may change over time, such as due to patient movement or one or more environmental factors, which leads to a change in the impedance. In certain examples, a defibrillator circuit is included within a biocompatible pulse generator body 302 (although the pulse generator body is customarily referred to as such, it typically includes sophisticated electronics that are capable of performing various tasks other than merely providing electrical pulses to the subject). A functional circuit 304 may include one or more measurement or evaluation circuits, such as to control delivery of pacing or shock therapy. The circuit 304 may be connected in association with the heart of the patient, such as by using one or more leads extending from the pulse generator body 302 through an insulating header 306 extending therefrom, such as via one or more hermetic pass-throughs 308. The circuit 304 may connect a capacitor or other power source 310 to the heart, such as for pacing or defibrillation shock therapy. In certain examples, an antenna may be wrapped around the pulse generator body 302. The antenna may also communicate with the circuit 304, such as via one or more of the hermetic pass-throughs 308, such as to transmit information or commands to or from an external device, such as an external programmer or repeater being used by a physician. The circuit 304 may contain a variable matching network, such as to improve the efficiency of the antenna transmission or reception.

Although the present examples emphasize a implantable medical device application, certain aspects of the present systems and methods may also apply in other contexts. For example, the present methods include forming an apparatus for increasing or maximizing power transfer from a source to a load in a varying impedance environment, such as by connecting a transceiver to a reflected power detector and a matching network. The matching network may be connected between a transceiver and an antenna operating in a variable impedance environment. An example of a variable impedance environment includes a human body that may change its position or orientation, such as from standing to prone. The reflected power detector may be connected to a control circuit. The control circuit may use the reflected power value to determine a change in the impedance that will provide better operation. The control circuit may be connected to the matching network. The control signal may use the reflected power value to issue a control signal to the matching circuit to change the impedance match. Also, there may be an external signal input connected to the control circuit. This permits user input, such as to provide an override function, or to specify which operational frequency band is appropriate for the particular geographical location. In response to a control signal received from the control circuit, the matching network can adjust the value of a capacitor, an inductor, or a resistor. The matching network may be formed in numerous ways, such as using components on a printed circuit board, a hybrid device, or may be formed on a single integrated circuit chip. The described system may contain more than a single antenna and control each of them separately or together in any combination, and may be connected to measure differential matching. The system may control the impedance match to perform operational tests in a manufacturing environment to determine if the system is operational.

The external signal input may be used to pass a desired frequency band value for the antenna system to the control circuit. The reflected power detector may include a voltage standing wave ratio detector providing a figure of merit, such as a minimum or maximum value of a voltage standing wave ratio. The matching network may include one or more capacitors connected between the output to or from the antenna or a ground voltage source. In this example, the capacitors are shown in a parallel connection between the transceiver and the antenna, and there may be one or more inductors connected between the output to the antenna and a power voltage source. Some of the capacitors or inductors may use a switch to remove them from active operation in the matching network, thereby changing the match.

Another example uses an implantable variable antenna matching network in an implantable pulse generator body. An antenna may be circumferentially wrapped around an outer portion of the implantable pulse generator body. The use of a conductive layer on the pulse generator body acts as a ground plane and the antenna radiates with respect to the ground plane. A signal generated within the pulse generator body may exit through one or more hermetic electrical passthroughs (also called feed-throughs) in the pulse generator body. This may permit electrical communication between the antenna and an integrated circuit inside the pulse generator body. A feed-through may also be used for sensing or delivering one or more signals to the patient's heart or one or more other organs. A feed-through may also be used for communicating one or more signals intended for one or more other medical devices implanted in the same body. The integrated circuit may include a timer circuit, a memory register, a variable matching network circuit having selectable capacitive values enabled in response to a control circuit. There may also be a voltage standing wave ratio (VSWR) detector circuit, for example, providing to the control circuit matching efficiency information representing an impedance match quality between the variable matching network and the antenna. There may be a radio frequency transceiver circuit connected to the integrated circuit, a power source, and a user interface to provide override capability for the automated system.

The matching network may further use the voltage standing wave ratio detector to provide the control circuit with a signal. This permits the control circuit to respond, such as to a specified change in the VSWR (e.g., exceeding a stored threshold value). Such response may also be conditioned on a timer measuring that the detection condition (e.g., specified change in the VSWR) has persisted for a specified elapsed time. Moreover, one or more other conditions check on the impedance match can also be used. In certain examples, the control circuit may be configured such that it continuously varies the selected matching impedance to see if the transmission efficiency can be improved or maximized. This may involve storing in memory a history of impedance match values. A stored history of impedance values may also be useful to a clinician or other device-monitoring user. Therefore, in some examples, information about the current or historical impedance match values can be communicated from the implantable device to a user-accessible external device.

In certain examples, a method of increasing or maximizing wireless communication power transfer includes first measuring a reflected power value of the antenna. Then, the matching network is adjusted, such as to incrementally increase the total matching impedance value. Then, the reflected power value is measured again for a second time. If the second reflected power value is less than the first value, then the incremental increase in impedance improved the impedance match. If so, the total impedance is again incrementally increased and the reflected power value is re-measured and evaluated, and this process can continue until the measured reflected power value increases. This indicates that the most recent incremental increase in the total matching impedance pushed the reflected power beyond a minimum value. If so, the total matching impedance value can be decreased by the same increment for subsequent operation at the reflected power minimum value for the then-current impedance environment.

However, if the second reflected power value is greater than the first value, indicating a change in the wrong direction, then the total impedance is incrementally decreased by a selected amount, which should decrease the reflected power. An incremental decrease and re-measure cycle can be repeated until the measured reflected power value increases. This indicates that the most recent incremental decrease in the total matching impedance has pushed the reflected power beyond a minimum value. If so, the total impedance matching impedance value can be increased by the same increment for subsequent operation at the reflected power minimum value for the then-current impedance environment.

After a selected period of time has elapsed, it is possible that the impedance environment has again changed, so the incremental impedance change test and measure approach can be repeated until a new reflected power minimum is found for the then-current impedance environment. The selected period of time can be a specified constant, or a variable value that can be based on one or more sensors. For example, if an accelerometer or other physical activity sensor indicates a large degree of patient physical activity, the re-test interval can be shortened.

If the control system is as shown in FIG. 1, primarily using switched capacitors to change the matching impedance, which is especially useful when using a monolithic integrated circuit to perform the impedance matching, then the method of adjusting the matching network value may include connecting selected ones of a large number of capacitors (having various capacitance values) between the matching network transmission line and a ground potential voltage supply. To obtain larger matching impedance changes, the method may include adjusting the matching network value by choosing to connect selected ones of a second transmission line (e.g., having different valued capacitors connected in parallel) to the first transmission line.

Since the system may repeat the measurement technique after a selected period of time has elapsed, it may be beneficial to store the measured reflected power minimum values and to additionally repeat the reflected power decrease or minimization process, such as if a measured power reflection value changes from the stored reflected power minimum value by a specified threshold value, and not wait until the next scheduled time. The measurement may also be triggered in response to an external command code, which can provide an override function to the automated circuit.

In certain examples, a method of increasing or maximizing radiated power in an antenna includes measuring a voltage standing wave ratio (VSWR), such as at specified time intervals. A capacitor value in the matching circuit is then changed. Another VSWR measurement determines whether the change in the capacitor value improved the radiated power. The process can be repeated until no further improvement is found. In certain examples, a log over time of the matching capacitance values are recorded, such as for communication to a user-accessible external device. In certain examples, if the capacitive value changes by more than a specified threshold value over an interim time period between two test routines, a warning is communicated to the user-accessible external device.

Certain examples include an implantable medical device with an implantable transceiver and an implantable antenna. The antenna impedance may vary, for example, dependent upon whether the antenna is in the air or implanted into a patient, or dependent upon the particular location at which the antenna is implanted, dependent upon the patient's body composition, such as percentage of fat, or dependent upon the position of the patient, such as lying down or standing. In certain examples, the implantable medical device includes an impedance mismatch detector circuit, coupled to the transceiver and the antenna. The impedance mismatch detector circuit detects an impedance mismatch between the transceiver and the antenna. A impedance matching circuit can be coupled between the transceiver and the antenna. A control circuit can use the impedance mismatch to adjust the impedance value of the impedance matching circuit to decreases the impedance mismatch between the transceiver and the antenna. The mismatch circuit may repeatedly or periodically monitor the impedance mismatch a closed-loop manner using the impedance mismatch as a control input. A reflected power detector circuit may detect reflected power as an indication of the impedance mismatch, or a voltage standing wave ratio (VSWR) detector circuit may detect an indication of an impedance mismatch, or one or both of VSWR and reflected power can be used with the other or another indication of impedance mismatch. In various examples, the impedance matching circuit may include an adjustable-value capacitor, an adjustable-value inductor, an adjustable-value resistor, or one or more alternate transmission paths to vary the matching circuit's impedance value. The matching circuit may be formed on a single integrated circuit.

The impedance value may also be adjustable in response to information from an external source, such as to provide an override function, or to indicate a particular frequency band that the implantable device is to use for communication. The device may be within a housing, and the antenna may be circumferentially wrapped around a portion of the housing. This may provide a reliable antenna support.

An example includes a device with means for detecting an impedance mismatch between an implantable transceiver and an implantable antenna. There may be means for using the impedance mismatch as a control input for adjusting a matching circuit to decrease the impedance mismatch and increases or maximizes the communication power transfer.

An example may include a method for detecting an impedance mismatch between an implantable transceiver in an implantable medical device and an implantable antenna of the implantable medical device. The effective impedance of the antenna depends upon whether the antenna is implanted into a subject, a location at which the antenna is implanted into the subject, and a body shape of the subject. Adjusting a matching circuit to decrease the impedance mismatch and increase the communication power transfer. Detecting the impedance mismatch may include repeatedly monitoring the impedance mismatch, and adjusting the matching circuit by repeatedly adjusting the applied impedance in a closed-loop, using the impedance mismatch as the control input. Detecting the impedance mismatch may include measuring an indication of reflected power, or measuring a voltage standing wave ratio. Adjusting the matching circuit may include selecting one or more particular capacitors and connecting the selected capacitors between an RF signal path in the matching circuit and a signal ground, and this may be performed automatically after implantation of the medical device into the body of the subject, or overridden in response to a command code received by the implantable medical device from an external source.

The method may include the acts of measuring a first voltage standing wave ratio, then adjusting the capacitive value in the matching circuit by a selected incremental value in a selected direction to form another capacitive value, then measuring a second voltage standing wave ratio and adjusting the first capacitive value by the selected increment in the selected direction if the second measurement indicates increased radiated power, and repeating the method until a difference between the first and second capacitive values is less than a selected value and setting the existing capacitive value to the second capacitive value.

The capacitive values may be recorded over a period of time and a warning may be sent to a user if the capacitive value changes by more than a specified first threshold value between two repetitions. A warning may also issue to a user if any recorded capacitive values exceeds a specified second threshold value, or if a difference between capacitive values recorded during a specified time period exceeds a third threshold value.

It should be noted that the illustrative examples discussed herein are not intended to be limited to the specific disclosed arrangements, but may include any method of forming a matching network that may adjust, such as to compensate for different operational bands and to one or more changes in the operating environment.

The above description is intended to be illustrative, and not restrictive. For example, the above-described embodiments (or one or more aspects thereof) may be used in combination with each other. Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. An apparatus comprising:
    an implantable medical device including:
        an implantable transceiver;
        an implantable antenna, wherein an effective impedance of the antenna is variable dependent upon at least one of whether the antenna is implanted into a subject, a location at which the antenna is implanted into the subject, a body composition, and a body shape of the subject;
        a matching circuit, coupled to the antenna;

an impedance mismatch detector circuit, coupled between the transceiver and the matching circuit, the impedance mismatch detector circuit configured to detect an indication of an impedance mismatch between said implantable transceiver in said implantable medical device and said implantable antenna; and a control circuit, coupled to the impedance mismatch detector circuit and the matching circuit, the control circuit configured to use the indication of the impedance mismatch as a control input to adjust the matching circuit in a manner that decreases the impedance mismatch and increases or maximizes a communication power transfer value associated with the implantable medical device.

2. The apparatus of claim 1, wherein the impedance mismatch detector circuit is configured to repeatedly monitor the indication of the impedance mismatch, and wherein the control circuit is configured to repeatedly adjust the matching circuit in a closed-loop manner using the indication of the impedance mismatch as the control input.

3. The apparatus of claim 1, comprising a reflected power detector circuit configured to detect an indication of a reflected power that is included in the indication of the impedance mismatch.

4. The apparatus of claim 3, wherein the reflected power detector circuit comprises a voltage standing wave ratio detector circuit to detect an indication of a voltage standing wave ratio that is included in the indication of the impedance mismatch.

5. The apparatus of claim 4, wherein the control circuit is configured for closed-loop operation to generally decrease or minimize a voltage standing wave ratio.

6. The apparatus of claim 1, wherein the matching circuit includes at least one of an adjustable-value capacitor, an adjustable-value inductor, an adjustable-value resistor and a plurality of alternative transmission paths having different matching circuit values.

7. The apparatus of claim 6, wherein the matching circuit is formed on a single integrated circuit.

8. The apparatus of claim 1, wherein the matching circuit comprises an adjustable impedance value that is adjustable in response to information received by the implantable medical device from an external source, the information indicating a particular frequency band designated to the transceiver for communication.

9. The apparatus of claim 1, wherein the matching circuit automatically adjusts the impedance to change transmission to a frequency band in response to an external signal.

10. The apparatus of claim 1, wherein the matching circuit comprises an adjustable impedance value that is adjustable in response to information received by the implantable medical device from an external source to specify an impedance match value.

11. The apparatus of claim 1, in which the implantable medical device includes a housing, and wherein the antenna is circumferentially wrapped around a portion of the housing.

12. An apparatus comprising:
means for detecting an indication of an impedance mismatch between an implantable transceiver in an implantable medical device and an implantable antenna of the implantable medical device, wherein an effective impedance of the antenna is variable dependent upon at least one of whether the antenna is implanted into a subject, a location at which the antenna is implanted into the subject, and a body shape of the subject; and
means for using the indication of the impedance mismatch as a control input for adjusting a matching circuit in a manner that decreases the impedance mismatch and increases or maximizes a communication power transfer value associated with the implantable medical device.

13. A method comprising:
detecting an indication of an impedance mismatch between an implantable transceiver in an implantable medical device and an implantable antenna of the implantable medical device, wherein an effective impedance of the antenna is variable dependent upon at least one of whether the antenna is implanted into a subject, a location at which the antenna is implanted into the subject, and a body shape of the subject; and
using the indication of the impedance mismatch as a control input, adjusting a matching circuit in a manner that decreases the impedance mismatch and increases or maximizes a communication power transfer value associated with the implantable medical device.

14. The method of claim 13, wherein the detecting the indication of the impedance mismatch includes repeatedly monitoring the indication of the impedance mismatch, and wherein the adjusting the matching circuit includes repeatedly adjusting in a closed-loop manner using the indication of the impedance mismatch as the control input.

15. The method of claim 14, wherein the detecting the indication of the impedance mismatch includes measuring an indication of reflected power.

16. The method of claim 15, wherein the measuring the indication of reflected power of the antenna includes measuring a voltage standing wave ratio.

17. The method of claim 13, wherein the adjusting the matching circuit includes selecting one or more components selected from capacitors, resistors, and inductors, and connecting the selected one or more components in at least one of a series connection and a shunt connection between an RF signal path in the matching circuit and one of a signal ground and a power supply.

18. The method of claim 13, wherein the detecting the indication of the impedance mismatch and the adjusting the matching circuit are performed automatically after implantation of the implantable medical device into the body of the subject.

19. The method of claim 13, wherein the detecting the indication of the impedance mismatch and the adjusting the matching circuit are performed in response to a command code received by the implantable medical device from an external source.

20. The method of claim 13, comprising:
(a) measuring a first voltage standing wave ratio;
(b) adjusting an existing capacitive value in the matching circuit by a selected incremental value in a selected direction to form a first capacitive value;
(c) measuring a second voltage standing wave ratio and adjusting the first capacitive value by the selected increment in the selected direction if the second measurement indicates increased radiated power, and setting the first capacitive value to equal the second capacitive value;
(d) adjusting the existing capacitive value by the selected increment in a direction opposite the selected direction if the second measurement indicates decreased radiated power to form a second capacitive value and setting the existing capacitive value to the second capacitive value; and
repeating the acts of (a), (b), (c), and (d) until a difference between the first and second capacitive values is less than a selected value and setting the existing capacitive value to the second capacitive value.

21. The method of claim 20, comprising recording an indication of the existing capacitive values over a period of time and communicating a warning to a user if the existing capacitive value changes by more than a specified first threshold value between two of the repetitions of the acts of (a), (b), (c), and (d).

22. The method of claim 21, comprising communicating a warning to a user if any recorded indication of the existing capacitive values exceeds a specified second threshold value.

23. The method of claim 21, comprising communicating a warning to a user if a difference between existing capacitive values recorded during a specified time period exceeds a third threshold value.

* * * * *